J. HARLAN.
Apparatus for Pressing Butter.
No. 200,392. Patented Feb. 19, 1878.
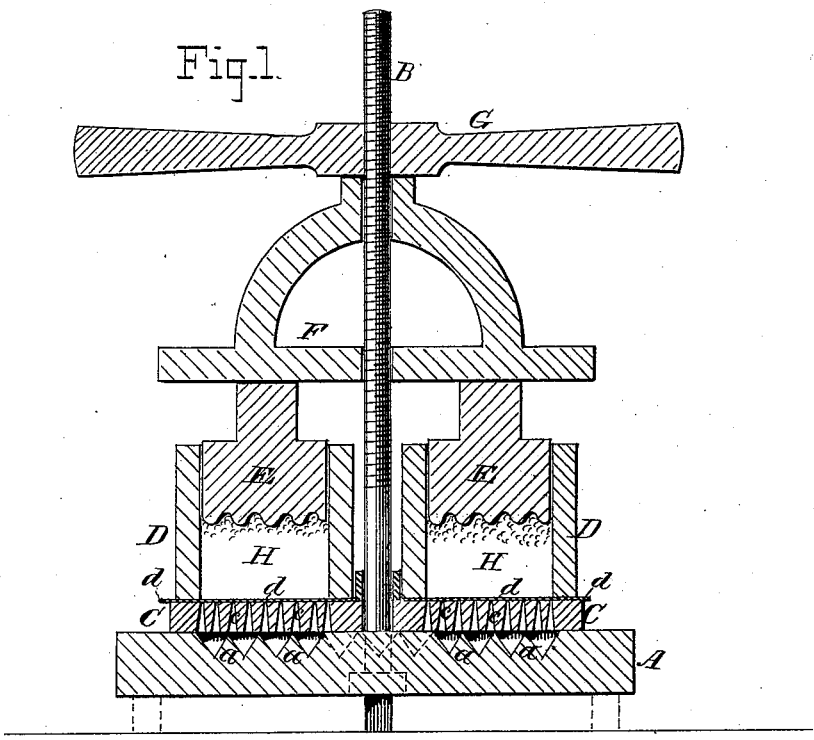
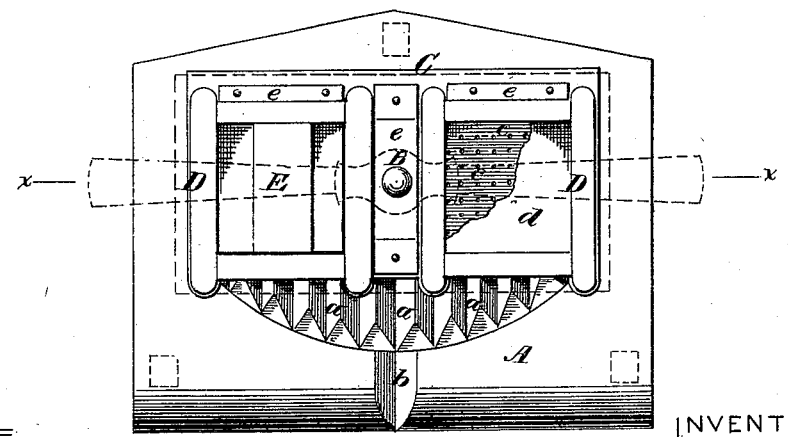

UNITED STATES PATENT OFFICE.

JOSEPH HARLAN, OF LEXINGTON, INDIANA.

IMPROVEMENT IN APPARATUS FOR PRESSING BUTTER.

Specification forming part of Letters Patent No. 200,392, dated February 19, 1878; application filed November 19, 1877.

*To all whom it may concern:*

Be it known that I, JOSEPH HARLAN, of the town of Lexington, in the county of Scott and State of Indiana, have invented certain Improvements in Apparatus for Pressing Butter, as set forth in the following specification:

This invention relates to an apparatus or press for preparing butter for market or for the table by thoroughly solidifying it through the medium of pressure, thus expelling all the moisture therefrom and rendering it homogeneous throughout.

It has been and is customary, in making butter, to simply mold it into shape without submitting it to a solidifying pressure. This method necessarily leaves a considerable quantity of fluid, consisting of milk and water, intimately mixed with the butter, and by reason of this the latter becomes rancid much sooner than it otherwise would. Attempts have been made to rid the butter of fluids by forcing it through small holes, from whence it passes into cold water; but this method does not appear to have come into use.

Butter pressed in my improved apparatus will remain firmer in hot weather than ordinary molded butter, will take up less room in packing, and will contain more real butter to the pound.

In the drawings, Figure 1 is a vertical section of the press, taken in the plane of the line *x x*, Fig. 2; and Fig. 2 is a plan of the same with some of the upper portions dotted in.

Let A represent a base, having a portion of its upper surface corrugated or grooved at *a a*, and provided with a suitable spout, *b*.

B is a central screw, fixed rigidly to the base A. C is a bottom board, provided with numerous conical perforations, *c c*, and bored to slip down over the screw B. Over the perforations in the board C are placed muslin bottom cloths *d d*. Mounted loosely upon the board C, so as to surround the perforations therein, are the butter-matrices D D, one on each side of the screw B. Into these fit the followers E E, which may be carved on the under side, if desired.

Resting upon the followers is a pressure-plate, F, and on this bears the handled nut G. The matrices are guided to their proper places by guide-strips *e e*. H represents the butter being pressed.

The press is provided with two matrices, arranged on opposite sides of the central screw, in such a manner that both may be grouped beneath the pressure-plate and their contents be acted upon with equal force; and to this end it is best, in using the press, to weigh the butter and put approximately the same amount in each matrix.

It would be possible to arrange more than two matrices around the central screw; but I prefer two as being more convenient.

With the exception of the screw and base, which are secured rigidly together, all the parts of the press are separate and disconnected. This enables the user to take it apart and thoroughly clean it—a very important thing when dealing with butter.

The bottom cloths *d d* should be large enough to permit the matrices to rest upon them. They prevent the butter from being forced through the perforations *c c*. These latter are made conical, so as to provide the freest possible escape at the bottom for the expressed liquids.

The corrugations *a a* serve to convey away all liquids from the matrices, and yet form a support for the board C.

I claim—

The combination of the corrugated base A, fixed screw B, base-board C, perforated as specified, bottom cloths *d d*, two or more matrices, D D, grouped around the screw, followers E E, pressure-plate F, and nut G, substantially as set forth.

In witness whereof I have hereunto signed my name in the presence of two subscribing witnesses.

JOSEPH HARLAN.

Witnesses:
JONATHAN SHEARER,
DAVID MUNSON.